United States Patent
Appa

[11] Patent Number: 6,127,739
[45] Date of Patent: Oct. 3, 2000

[54] JET ASSISTED COUNTER ROTATING WIND TURBINE

[76] Inventor: Kari Appa, 22242 Anthony Dr., Lake Forest, Calif. 92630-2327

[21] Appl. No.: 09/273,588

[22] Filed: Mar. 22, 1999

[51] Int. Cl.[7] .................................. F03D 9/00; H02P 9/04
[52] U.S. Cl. .............................. 290/55; 290/42; 290/44; 290/53; 290/54
[58] Field of Search ......................................... 290/52–55

[56] References Cited

U.S. PATENT DOCUMENTS

| | | | |
|---|---|---|---|
| 4,061,926 | 12/1977 | Peed | 290/55 |
| 4,208,590 | 6/1980 | Blomquist et al. | 290/1 R |
| 4,291,233 | 9/1981 | Kirscbaum | 290/1 C |
| 4,648,801 | 3/1987 | Wilson | 416/171 |
| 4,764,683 | 8/1988 | Coombes | 290/55 |
| 4,976,587 | 12/1990 | Johnston et al. | 416/230 |
| 5,150,859 | 9/1992 | Ransick | 244/58 |
| 5,419,683 | 5/1995 | Peace | 416/227 |
| 5,456,579 | 10/1995 | Olson | 416/51 |
| 5,506,453 | 4/1996 | McCombs | 290/44 |
| 5,760,515 | 6/1998 | Burns | 310/115 |

*Primary Examiner*—Elvin Enad

[57] ABSTRACT

A jet assisted counter rotating wind turbine comprising:
- a pair of counter rotating rotors to amplify the relative velocity of the magnetic flux in the air gap of an alternator,
- a dual purpose co-axial device that serves the role of an alternator to generate electricity as well as a torque transmission means,
- an axial compressor to energize the low energy air mass taken from the downstream wake region, and
- an actively controlled piezoelectric actuator device to deform the trailing edge section to maintain optimum air load distribution at all wind speeds without causing any structural damage in gusty environment, has been conceived and is now reduced to practice.

The proposed wind turbine achieves a substantially high value of energy efficiency factor, while theoretically possible factor is about 69 per cent. Hence, the turbine unit can be built using smaller and lighter rotors in contrast to those of prior art. Furthermore, these turbines can be installed in low speed wind environment wherein the prior art turbines do not produce any useful energy.

3 Claims, 4 Drawing Sheets

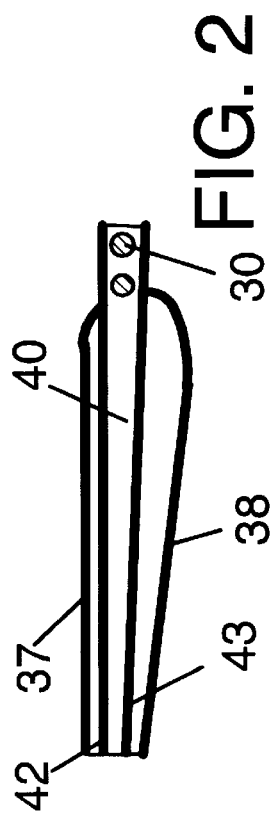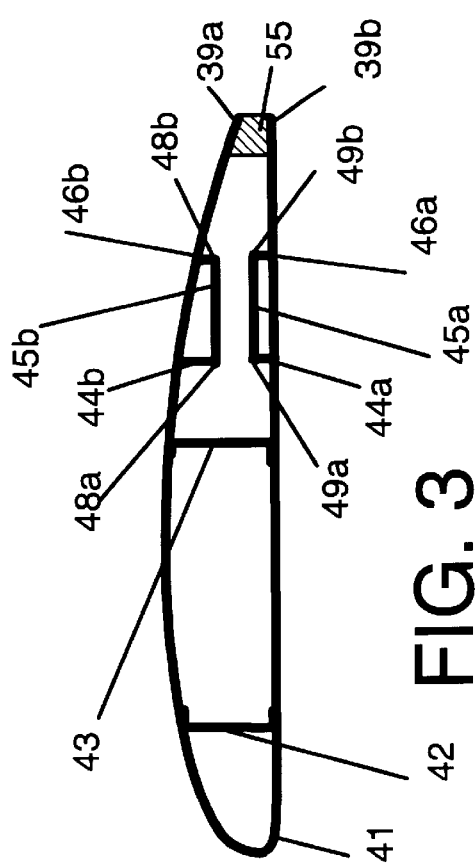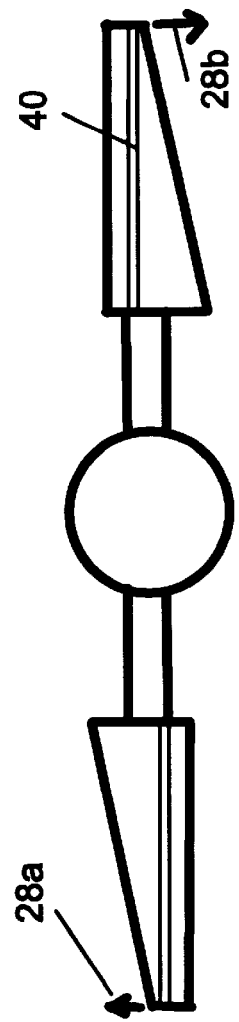

JET ASSISTED COUNTER ROTATING WIND TURBINE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of Invention

The present invention relates generally to a wind energy conversion device, more particularly, to the design and manufacturing of a jet assisted counter rotating wind turbine.

2. Description of Prior Art

Wind turbines of various designs are in use to generate electrical energy. A wind turbine generally comprises of a rotor having plurality of airfoil shaped blades, an alternator, and a supporting structure. Heretofore, wind turbine manufacturers employ a single rotor system that comprises of two or more said blades. An alternator consists of a rotor, generally having permanent magnets and an armature comprising of plurality of wound coils. Said armature is fixed to said structure, while the magnetic rotor is connected to said turbine rotor. The relative speed in the air gap between the outer surface of said magnetic rotor and the inner surface of said armature is directly proportional to said turbine rotor speed. When the wind speed is less than the cut-in speed, for example 12 miles per hour, said wind turbine system ceases to produce useful electrical energy. Another serious drawback of such conventional wind turbines is that they require large diameter rotors to extract energy from the wind. Large blades require thicker gage materials to minimize failure due to vibration and dynamic loads in gusty wind environment. In spite of careful design and regular inspections many wind turbines in the wind farms suffer structural failures and become inoperative. Thus, the wind turbines of prior art are, mechanically inefficient, prone to catastrophic failures, and not competitive in price per kilowatt-hour.

To alleviate these problems, jet assisted counter rotating wind turbine of the present invention is proposed. The new design has the advantage of substantially increased energy conversion efficiency, reduced cost of ownership, reduced operating cost and increased structural durability. The prior art abounds with examples of single rotor turbine systems. A number of patents disclosing typical inventions pertinent to the present invention will now be presented.

U.S. Pat. No. 4,976,587 to J. Ford Johnston et al (Dec. 11, 1990) discloses a method for manufacturing composite blades having highly improved aerodynamic efficiency. They used the NASA airfoil section LS(1)-04XX having 29 per cent thickness at 3/10 radius and 18 per cent at the blade tip. The airfoil section comprises of two spars, which terminate into a circular section at the hub. The claim primarily relates to the manufacturing aspect of composite blades. However, similar to any other conventional wind turbines, their design uses a single rotor having three aerodynamically efficient blades. However, this design does not extract major portion of the available wind energy.

U.S. Pat. No. 5,419,683 to Steven J. Peace (May 30, 1995) discloses a method of installing plurality of wind turbines on chimney, tower or the like. Two rotors having their horizontal axes are mounted back to back on a ring that turns about the chimney. The primary idea of this invention is to utilize existing structures to mount plurality of wind turbines and to eliminate the need for wind farms. The major drawback is that the unsteady vorticities shed from the chimney impinge up on the leeward rotor and excite the blades to vibrate violently to destruction. Hence, this concept is not practical, and moreover it is aerodynamically inefficient.

U.S. Pat. No. 4,648,801 to Robert R. Wilson (Mar. 10, 1987) discloses a method of compressing air by means of a wind turbine. The air is drawn from the low energy region of the downwind stream. The compressed air is connected to the intake of a prime mover (such as a diesel engine, a gasoline engine, or a gas turbine) to boost its output power. This prime mover drives an alternator. Although the integration of the air compressor is a novel idea, the overall efficiency decreases due to mechanical loses that arise from additional units such as the prime mover and the alternator.

U.S. Pat. No. 5,456,579 to Timothy G. Olson (Oct. 10, 1995) discloses a wind turbine blade with a governor to maintain optimum rotational speed and more particularly pertains to a governor that positions an aileron for varying wind speed. The governor consists of a lead weight positioned at the wing tip and connected to a mechanism that deploys said aileron to achieve the maximum lift to drag ratio at all wind speeds. This is another novel idea, but the operational mechanisms are not robust and are prone to malfunction due to bending and twisting of the blade in gusty wind environment.

It was with the knowledge of the foregoing state of the technology that the present invention has been conceived and is now reduced to practice.

SUMMARY OF THE INVENTION

The present invention relates generally to a wind energy conversion device, more particularly, to the design and manufacturing of a jet assisted counter rotating wind turbine comprising:

- a windward turbine rotor that is directly connected to a magnetic rotor of an alternator,
- a leeward turbine rotor that is directly connected to an armature of said alternator,
- an axial air compressor that is mounted on the outer co-axial shaft and driven by a solid state electric motor,
- a metallic circular mast upon which said wind turbine unit is mounted by means of a bearing,
- a piezoelectric actuator device to deploy the trailing edges for maintaining optimal lift to drag ratio.

Accordingly, the advantages of the present invention compared to those of prior art are:

- the co-axial shafts having dual role of torque transmission means and electrical power generation means,
- the dual role supports reduced structural weight, reduced mechanical friction and power transmission losses,
- the counter rotating device increases the relative rotational speed of the magnetic flux in the air gap in said alternator and consequently delivers substantially increased power,
- the counter rotating wind turbine device has the cut-in wind as low as 4 miles per hour compared to 12 miles per hour for the prior art, the axial compressor energizes the stagnant air mass to assist the leeward turbine thereby increasing its aerodynamic efficiency, smaller diameter rotors lead to improved structural integrity and durability, actively controlled piezoelectric actuators deploy the ailerons to maintain optimum lift to drag ratio at all wind speeds.

Accordingly, the present invention promotes the installation of wind turbines in such rural communities where the wind speed is less than cut-in wind speed for the conventional units. Additional objects and advantages are low cost of ownership and reduced maintenance. Still, further objects and advantages will become apparent from a consideration of ensuing description and accompanying drawings.

BRIEF DESCRIPTION OF THE DRAWINGS

Title of the Drawings

FIG. 2 shows a typical view of a rotor blade having an air passage between two spars FIG. 3 shows the airfoil section with piezoelectric actuator assisted deformable trailing edge FIG. 4 shows an overview of air jet assisted wind turbine blade assembly

Figure 1:
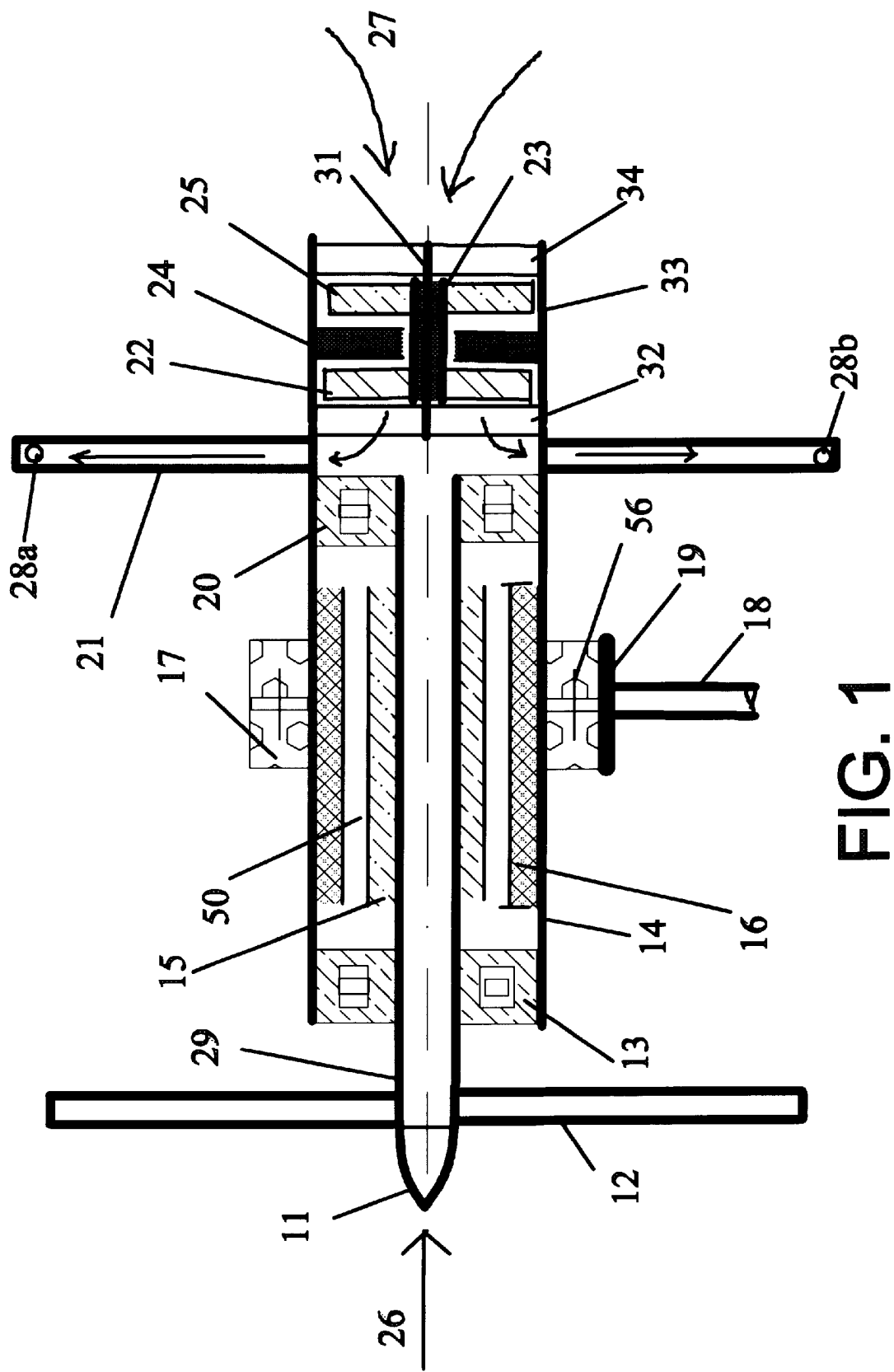
FIG. 1 shows the embodiment of a jet assisted wind turbine assembly

Reference Numerals 11 nose cone
12 windward rotor blade
13 forward bearing between the co-axial shafts
14 leeward rotor shaft
15 magnetic rotor
16 wound armature
17 leeward rotor shaft bearing attached to a swiveling base
18 mast
19 swiveling base attached to mast
20 rear bearing between the co-axial shafts
21 leeward rotor blade
22 second stage compressor blade
23 axial compressor motor
24 guide vane
25 first stage compressor blade
26 inlet air stream line
27 outlet air stream line entering the rotor blade
28a,b air jet outlet
29 windward rotor shaft
30 tapered hubs by which blades and shafts are connected
31 compressor axle
32 forward supporting bracket
33 axial compressor (case)
34 rear supporting bracket
35 compressed air passage along leeward rotor blade,
36 blade hub
36a,b tapered shanks
37 leading edge of the rotor blade
38 trailing edge of the rotor blade
39a upper skin of the trailing edge
39b lower skin of the trailing edge
40 air passage
41 rotor blade skin
42 front spar
43 rear spar
44a,b forward actuator attachment to skin
45a,b miniaturized piezoelectric actuator
46a,b rear actuator attachment to skin
47 low density non-metallic honeycomb
48a,b moving nodes when upper skin surface deforms
49a,b moving nodes when lower skin surface deforms
50 air gap between alternator rotor and armature
51a,b compressor motor bearings
52 magnetic rotor of motor
53 motor case
54 armature of motor
55 low density non-metallic honeycomb
56 slip rings to transfer electrical power to an external load

DETAILED DESCRIPTION OF THE INVENTION

This invention relates to a jet assisted counter-rotating wind turbine, and in particular producing more energy using smaller diameter rotors. Specific embodiments of this invention are presented next.

1. Preferred Embodiments of the Invention—Drawings

FIG. 1, generally illustrates a typical embodiment of a jet assisted counter-rotating wind turbine comprising:

a windward rotor 12 attached to an inner co-axial shaft 29,
a leeward rotor 21 attached to an outer co-axial shaft 14,
an axial air compressor 33 attached to said shaft 14,
a main bearing 17 supporting the wind turbine system and attached to a swivel base 19,
a pair of slip rings 56 enabling power transmission from the alternator to an external load,
a tubular mast 18 which in turn is attached to said swiveling base 19,
A nose cone attached to said shaft 29

FIG. 2 shows a plan view of a rotor blade with its top skin removed. The air passage 40 lies between the front spar 42 and the rear spar 43. The leading edge 38 and trailing edge 37 are straight, while the width of the blade decreases linearly from ³⁄₁₀ th radius to the tip.

FIG. 3 shows a schematic outline of an airfoil section, generally of NASA LS(1)04xx series, taken at any radial station of said blade. The trailing edge comprises of a pair of solid state (piezoelectric) actuators 45a, 45b attached to the upper and lower skins respectively by means of upper skin stringers 44b, 46b and lower skin stringers 44a, 46a.

FIG. 4 shows an overview of an air jet assisted wind turbine blade assembly in which air jets 28a, 28b exit in opposite directions at the leeward rotor blade tip.

Figure 5:
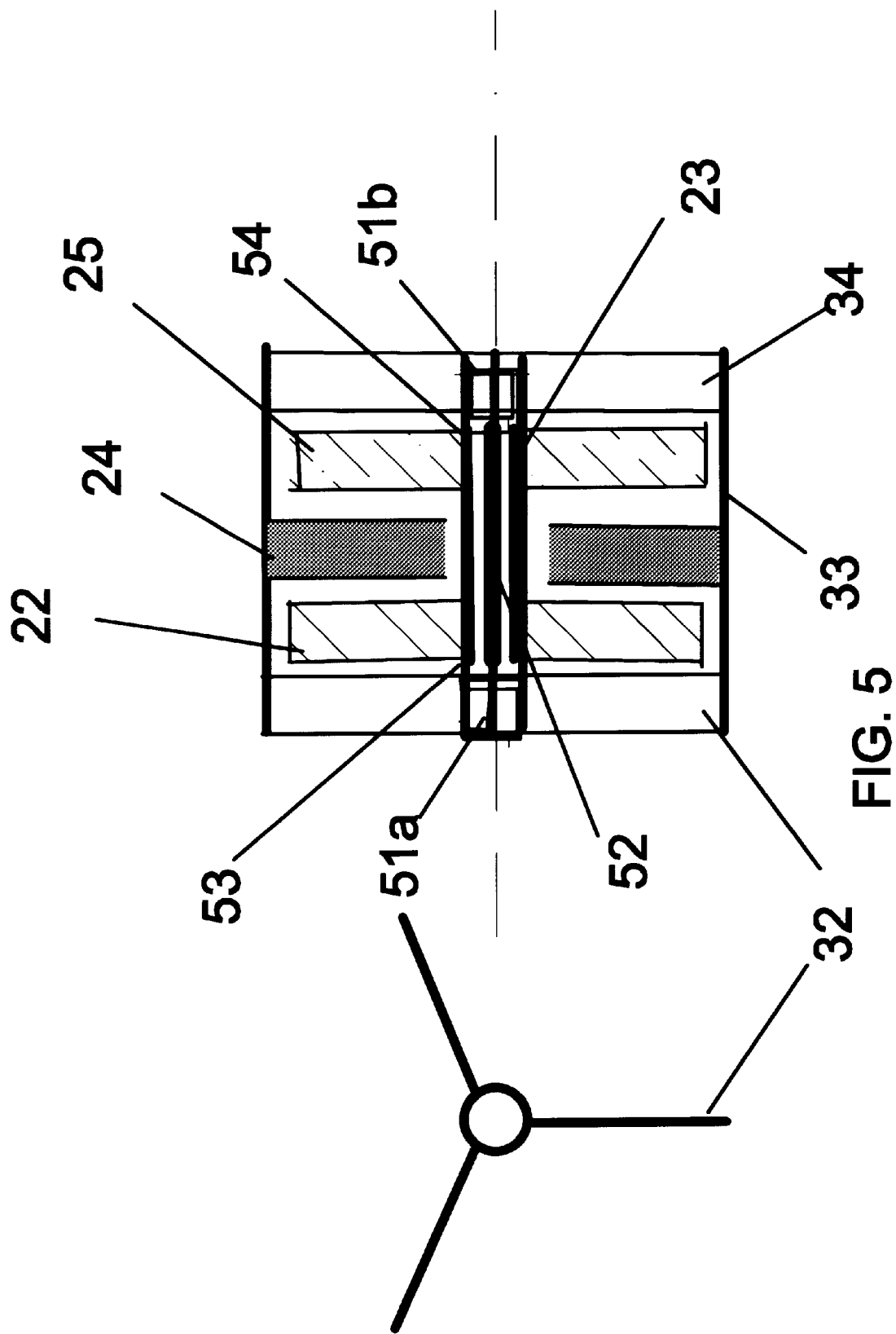
FIG. 5 shows an over view of an air compressor assembly

FIG. 5 shows a schematic outline of a two-stage axial compressor assembly comprising:

an electric motor 53,
plurality of first stage compressor blades 25 attached to the outer surface of a motor case 53,
plurality of guide vanes 24 attached to the inner surface of the compressor shell 33,
plurality of second stage compressor blades 22 attached to the outer surface of said motor case 53.

Figure 6:
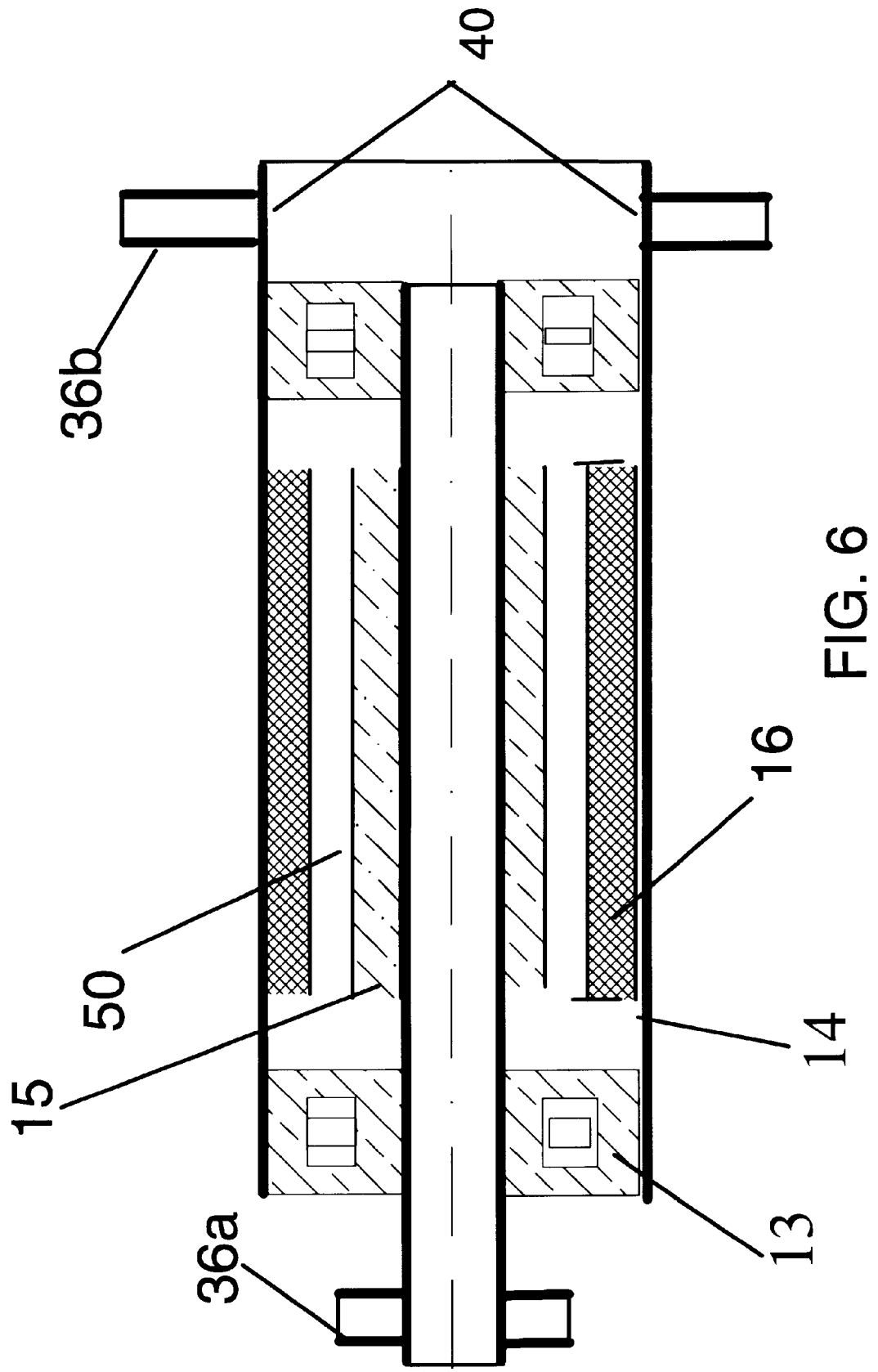
FIG. 6 shows the schematic of the co-axial shaft assembly including a solid state alternator

FIG. 6 shows the co-axial shaft assembly together with an alternator. Two bearings 13, 20 are used to support said shafts 14, 29 against radial and axial loads. Tapered tubular shanks 36a, 36b are welded to said shafts 14, 29 respectively. Air passage holes 40 are permitted in said shaft 14. In addition certain fastening holes are drilled in said shaft 14 to fasten said compressor.

2. Preferred Embodiments of the Invention—Operations

A schematic arrangement of a wind turbine according to the present invention is shown in FIG. 1. It has two rotors, a windward rotor 12 facing the upwind stream, and a leeward rotor 21 placed behind said rotor 12. Each rotor comprises of two or three blades. Each blade is made of an airfoil section depicted in FIG. 3. The angle of incidence of each airfoil section is set in an appropriate orientation so that the countervailing aerodynamic forces push the rotors to spin in opposite directions. The primary objective of this arrangement is to increase the flux rate in the magnetic field that would produce electricity even at wind speeds as low as 4 miles an hour.

For this reason said windward rotor 12 is directly coupled to an inner shaft 29, while said leeward rotor is directly coupled to an outer tubular shaft 14. Permanent magnetic strips are imbedded to the outer surface of said shaft 29. Similarly, the armature windings 16 are attached to the inner surface of said shaft 14. The co-axial shaft unit serves the dual purpose, as an alternator to generate electricity and as a device to transmit torque.

Said magnetic rotor 15 and said armature 16 rotate in opposite directions to increase the relative speed in said air gap 50. Hence, the electrical energy produced by this method is almost twice that from the prior art. A pair of slip rings 56 is used to transfer electrical power from the armature to an external load. To ensure reduced drag forces on the supporting structure, a nose cone 11 is fixed to said shaft 29.

FIG. 5 illustrates still another embodiment of the invention in which an axial compressor 33 is provided to pump a mass of air taken from the wake region 26 behind said leeward rotor 21. The compressed air 27 passes through said air passage 40 in said blades 21. As the air moves along said blade further compression takes place due to the centrifugal effect. The compressed air exists as countervailing jets 28a, 28b at the blade tip in the plane of the rotor. Said air jets 28a, 28b produce a torque on said leeward rotor to increase its rotational speed. Thus, the energy conversion efficiency is further amplified.

Said compressor 33 comprising:
a solid state motor including a magnetic rotor 52, an axle 31, an armature 54, bearings 51a, 51b,
plurality of first stage compressor blades 25, second stage compressor blades 22 welded to the outer surface of said armature shell 54,
said axle 31 firmly fixed to a front supporting bracket 32, and a rear supporting bracket 34,
plurality of guide vanes 24 fixed to the inner surface of said shell 33, is fasten to the inner surface of said shaft 14.

FIG. 3 illustrates still another embodiment of the invention in which the trailing edges 37 of said blades 12, 21 are provided with actively controlled piezoelectric actuators 45a, 45b. Said actuators are fixed to the inner surface of skin 41 by means of stringers 44a, 44b, and 46a, 46b. The inner surfaces of trailing edges 39a, 39b are fixed to a low-density non-metallic honeycomb 55 that provides damping against vibration while permitting deferential movement of said edges 39a, 39b during deployment. Said actuators 45a, 45b either push or pull nodes 48a 48b and nodes 49a, 49b when an electric potential applied across two ends of said actuators 45a, 45b respectively. The electrical input to said actuators 45a, 45b is derived from said alternator device 15, 16. The actuator mechanism working in pair enables the trailing edge section 37 to deform smoothly either upward or downward as the case may be. This device can be used to maintain optimum lift to drag ratio with varying wind speeds. This mechanism is also applicable to control the rotor speed in gusty wind environment.

Thus, the twin rotor turbine system provides substantially increased energy conversion efficiency, while the theoretical limit is seen to be about 69 per cent. Furthermore, this system begins to produce useful energy at wind speeds as low as 4 miles per hour. Whereas, the prior art require the cut-in wind speed of 12 miles per hour or more. This is an extremely important factor that influences additional advantages such as reduced rotor diameter, reduced structural weight, increased structural integrity, reduced noise, reduced wind farm acreage and ability to produce energy in low speed wind environment.

CONCLUSIONS, RAMIFICATIONS, AND SCOPE

Accordingly, the reader will see that this invention provides substantially highly efficient wind turbine. The efficiency enhancement arises from three factors namely the counter rotating rotor system; the air jet assisted leeward rotor and an actively controlled trailing edge device. Since the energy conversion efficiency is substantially high, smaller diameter rotors can be used. This enhances structural integrity due to lower stress levels and also drastically reduces its overall weight.

Although the description above contains much specificity, these should not be construed as limiting the scope of the invention but as merely providing illustrations of some of the presently preferred embodiments of this invention. Various other embodiments and ramifications are possible within it's scope.

Thus, the scope of the invention should be determined by the appended claims and their legal equivalents, rather than by the examples given.

I claim:

1. An assembly of jet assisted counter rotating wind turbine comprising:
    (a) windward rotor having blade airfoils set to rotate in clockwise direction and mounted on the inner shaft of a co-axial transmission device that includes a permanent magnet rotor of an alternator,
    (b) a leeward rotor having said airfoils set to rotate in anti-clockwise direction and mounted on the outer shaft of said co-axial device including a wound armature of said alternator,
    (c) a pair of radial and thrust load bearings fitted between said co-axial shafts that serve the dual purpose of said alternator and said power transmission means,
    (d) an axial air compressor that is fixed to the outer rotating shaft and electrically linked to said alternator, and supplies compressed air to said leeward rotor,
    (e) a main bearing designed to withstand axial and radial loads fitted on to said outer shaft,
    (f) a pair of slip rings attached to said outer shaft to transmit electrical energy from said alternator to an external load,
    (g) a swivel platform to support said main bearing including a pair of slip ring brushes for energy transmission,
    (h) a tubular mast to support said swivel platform including the wind turbine unit,
that provides substantially enhanced energy production, lighter and durable structure requiring minimal maintenance, and an ability to produce electrical energy even in low speed wind environment.

2. A jet assisted counter rotating wind turbine set forth in claim 1 wherein said axial compressor comprising:
    (a) an electric motor including plurality of two stage compressor blades and bearings,
    (b) plurality of guide vanes fixed to a circular shell enclosing the compressor, (c) an inlet opening facing down stream wake region, that provides a countervailing air jets using compressed air taken from the downwind wake region to enhance the aerodynamic efficiency of the leeward rotor.

3. A jet assisted counter rotating wind turbine set forth in claim 1 wherein, an actively controlled piezoelectric actuation device comprising:

(a) plurality of pair of piezoelectric actuators fixed to the inner surface of the skin near the trailing edge of said leeward blades receiving electrical input signal proportional to the wind speed, (b) upper and lower trailing edge surfaces which deform under a pair of actively controlled actuator forces, provides a means to maintain the optimal value of lift to drag ratio at all wind speeds so that said wind turbine delivers maximum power output avoiding catastrophic structural damages in gusty wind environment.

\* \* \* \* \*